(12) United States Patent
Shima

(10) Patent No.: US 6,362,894 B1
(45) Date of Patent: Mar. 26, 2002

(54) NETWORK PRINTER AND NETWORK PRINTING METHOD

(75) Inventor: Toshihiro Shima, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/199,392

(22) Filed: Nov. 25, 1998

(30) Foreign Application Priority Data

Jan. 8, 1998 (JP) ............................................. 10-002061

(51) Int. Cl.$^7$ .............................................. G06F 15/00
(52) U.S. Cl. ..................... 358/1.15; 358/1.12; 358/1.13; 707/513; 707/523
(58) Field of Search ............................... 358/1.12, 1.13, 358/1.14, 1.15, 1.16, 1.1, 1.5; 707/3, 5, 101, 501, 512, 513, 523; 709/217, 218, 219

(56) References Cited

U.S. PATENT DOCUMENTS

| | | | | |
|---|---|---|---|---|
| 6,029,182 A | * | 2/2000 | Nehab et al. ................ | 707/523 |
| 6,061,700 A | * | 5/2000 | Brobst et al. ................ | 707/517 |
| 6,199,071 B1 | * | 3/2001 | Nielsen ........................ | 707/204 |

* cited by examiner

Primary Examiner—Mark Wallerson
(74) Attorney, Agent, or Firm—Sughrue Mion, PLLC

(57) ABSTRACT

A process for directly accessing a network and receiving and printing only required information of information resources. When information resources (a Web page) specified by a host computer are accessed, the configuration is analyzed based upon an HTML source code and the format of information constituting the Web page is checked. If the format is a format in which receiving is allowed, the information is received and added to the layout of printing. The information is checked for any information constituting the information resources indicating whether receiving is allowed or not. Hereby, required information can be individually received from the information resources, useless data can be prevented from being transferred and the required information can be promptly printed.

60 Claims, 10 Drawing Sheets

NETWORK PRINTER AND NETWORK PRINTING METHOD

BACKGROUND OF THE INVENTION

1. Field of the Invention

The present invention relates to a network printer and a network printing method which enables the direct accessing of information resources existing on a network such as the Internet, downloading of the information resources and printing of the information.

2. Description of the Related Art

A network printer connected to a network such as a local area network (LAN) and shared by plural host computers is known heretofore. Such a network printer receives and prints print jobs from a plurality of host computers connected to a network.

Recently, demand for printing information resources on the Internet has been increasing as the Internet has been developed. For typical information resources on the Internet, there is a Web page described in hypertext markup language (HTML) and provided by World Wide Web (WWW) server and others. If a user wants to print a Web page, he/she accesses a predetermined WWW server via a host computer and requests the WWW server to download a desired Web page to the host computer. Next, the host computer converts the Web page to print data and sends the print data to a network printer to print.

In the above prior art, if a user wants to acquire information resources stored in a WWW server and others on the Internet as a printed matter, he/she is required to first activate a host computer to access the desired server, then request the desired server to download the desired document data to the host computer and finally request the host computer to print the downloaded document data.

Therefore, if a user wants to acquire information resources which are updated periodically such as a Web page on a WWW server as a printed matter, he/she must always activate a host computer to access to the server which takes a lot of time.

To solve the above problem, it is also possible for a network printer to directly download a Web page without using a host computer (this is not the preceding art).

However, a Web page is composed of not only text data but also various data such as image data and music data, and all types of data which is not always required for printing. That is, generally, most of the important information is represented by text data, and the image data and others fulfill the role of supplementing the information represented by the text data and the decorative role of a Web page. A normal printer interprets and prints only received print data faithfully. Therefore, there occurs a problem that unnecessary information is downloaded and printed by a network printer, useless data is transferred and in addition, the printing speed is reduced.

SUMMARY OF THE INVENTION

The present invention is made to solve the above various problems and the object is to provide a network printer and a network printing method wherein specified information resources are directly accessed and only predetermined information in the information resources can be received and printed.

To achieve the above object, a network printer according to the present invention directly accesses information resources specified by an external device, analyzes the configuration of the information resources and receives and prints only predetermined information.

The present invention disclosed in Claim 1 is directed to a network printer for receiving and printing information resources on a network comprising configuration analyzing means for actively accessing specified information resources via a network and analyzing the configuration of the information resources, acquired range setting means for setting the information acquired range of the information resources based upon the above analyzed configuration, receive control means for receiving predetermined information of the information resources based upon the above information acquired range, and printing control means for controlling printing means based upon information received out of the information resources.

"Network" includes not only the Internet and an intranet but also a LAN. "Information resources" means a Web page of a WWW server and a file of a server according to a file transfer protocol (FTP) and others. "The configuration of information resources" means the type of information, a file name and other parameters concerning the information resources.

First, information resources to be accessed are specified to a network printer by an external host computer and others. Or, a plurality of information resources are registered beforehand in a memory built in a network printer or in an installed external memory and information resources to be accessed by the network printer are specified by selecting any of them. For example, if a Web page is to be accessed, a uniform resource locator (URL) is input. Hereby, the configuration analyzing means accesses specified information resources and analyzes the configuration. The acquired range setting means sets the range of information to be acquired based upon the analyzed configuration. For example, the acquired range setting means may be set so that only text data is acquired or only static image data is acquired. Receiving means receives the acquired information and the received information is printed via the printing control means.

Therefore, the network printer actively accesses information resources without using a host computer and can acquire and print only predetermined information of the information resources.

According to the present invention disclosed in Claim 2, the acquired range setting means can set an information acquired range based upon the format of information.

"The format of information" includes the format of Multipurpose Internet Mail Extensions (MIME) as defined in Request for comments (RFC) 1872, 2045, 2046, 2047 and 2049 for example. Various formats for character information, a static image, a dynamic image, music and others such as TeXT (TXT), HTML, Graphics Interchange Format (GIF), Joint photographic coding experts group (JPEG), Moving picture coding experts group (MPEG), Tag image file format (TIEF), Audio video interleaved (AVI) and Music instrument digital interface (MIDI) exist. The acquired range setting means can be set so that only predetermined format data is acquired. Hereby, not all image data is impartially excluded but image data according to a predetermined format is received and the acquisition of image data according to the other format can be excluded.

According to the present invention disclosed in Claim 3, storage means for storing received information is further provided and the acquired range setting means can also set an information acquired range based upon the format of information and the contents stored in the storage means.

For example, if storage means such as a hard disk is provided to a network printer and information received is stored in the storage means, the same information that is already stored is not required to be received again. Therefore, the acquired range setting means limits the acquired range of information based upon the format of information and can set the suitable acquired range of information by excluding information stored in the storage means in the above range.

According to the present invention disclosed in Claim 4, the acquired range setting means can also set an information acquired range based upon the format of the information resources and the attribute information.

For "attribute information", the quantity of data in the information resources, the date on which the information resources are created, information display size, distinction between color and monochrome, the number of scales, distinction of an advertisement or not and others can be given. The acquired range setting means can be set so that information exceeding a predetermined data quantity, information exceeding a predetermined display size, color image information, advertisement information and others are not acquired.

According to the present invention disclosed in Claim 5, the acquired range setting means can also set the information acquired range based upon the format of the information resources and the communication state of a network.

For "the communication state of a network", a transfer rate and the quantity of traffic can be given. If a network is congested, information can be promptly received and printed by excluding the acquisition of image information containing a large quantity of data and a load on the network can be prevented from being increased.

The present invention disclosed in Claim 6 is a network printing method for receiving and printing information resources on a network comprising the following steps: a step of specifying information resources, a step of accessing to the specified information resources via a network and acquiring the configuration information of the information resources, a step of analyzing the configuration of the information resources based upon the above configuration information, a setting step of setting the information acquired range of the information resources based upon the above analyzed configuration, a step of receiving information of the above information resources based upon the above information acquired range and a step of printing based upon the received information of the information resources.

Hereby, when information resources to be printed from an external host computer and others are specified, the configuration information of the information resources is acquired and the configuration is analyzed. Next, the range of information to be acquired is set based upon the configuration and only information in the set range is received and printed. Therefore, unnecessary information is never received and necessary information can be promptly received and printed.

According to the present invention disclosed in Claim 7, in the setting step, an information acquired range can be set based upon the format of the information resources.

Hereby, the similar action to the present invention disclosed in Claim 2 can be obtained.

According to the present invention disclosed in Claim 8, a step for storing received information is further provided and in a setting step, an information acquired range can be also set based upon the format of information and the contents of stored information.

Hereby, the similar action to the present invention disclosed in Claim 3 can be obtained.

According to the present invention disclosed in Claim 9, in a setting step, an information acquired range can be set also based upon the format of information and attribute information.

Hereby, the similar action to the present invention disclosed in Claim 4 can be obtained.

Further, according to the present invention disclosed in Claim 10, in a setting step, an information acquired range can be also set based upon the format of information and the communication state of a network.

Hereby, the similar action to the present invention disclosed in Claim 5 can be obtained.

The present invention disclosed in Claim 11 is a computer-readable medium on which a printing control program for receiving and printing information resources on a network is recorded and characterized in that the program comprises analyzing means for accessing specified information resources via a network and analyzing the configuration of the information resources, information acquisition managing means in which it is set every format of information whether the acquisition of information is right or not, acquired range setting means for setting the information acquired range of the information resources by referring to the information acquisition managing means based upon the analyzed configuration, receive control means for receiving predetermined information of the information resources based upon the information acquired range and printing control means for controlling printing means based upon information received out of the information resources to print.

Hereby, the similar action to the present invention disclosed in Claim 2 can be obtained.

DESCRIPTION OF THE PREFERRED EMBODIMENTS

Figure 1:
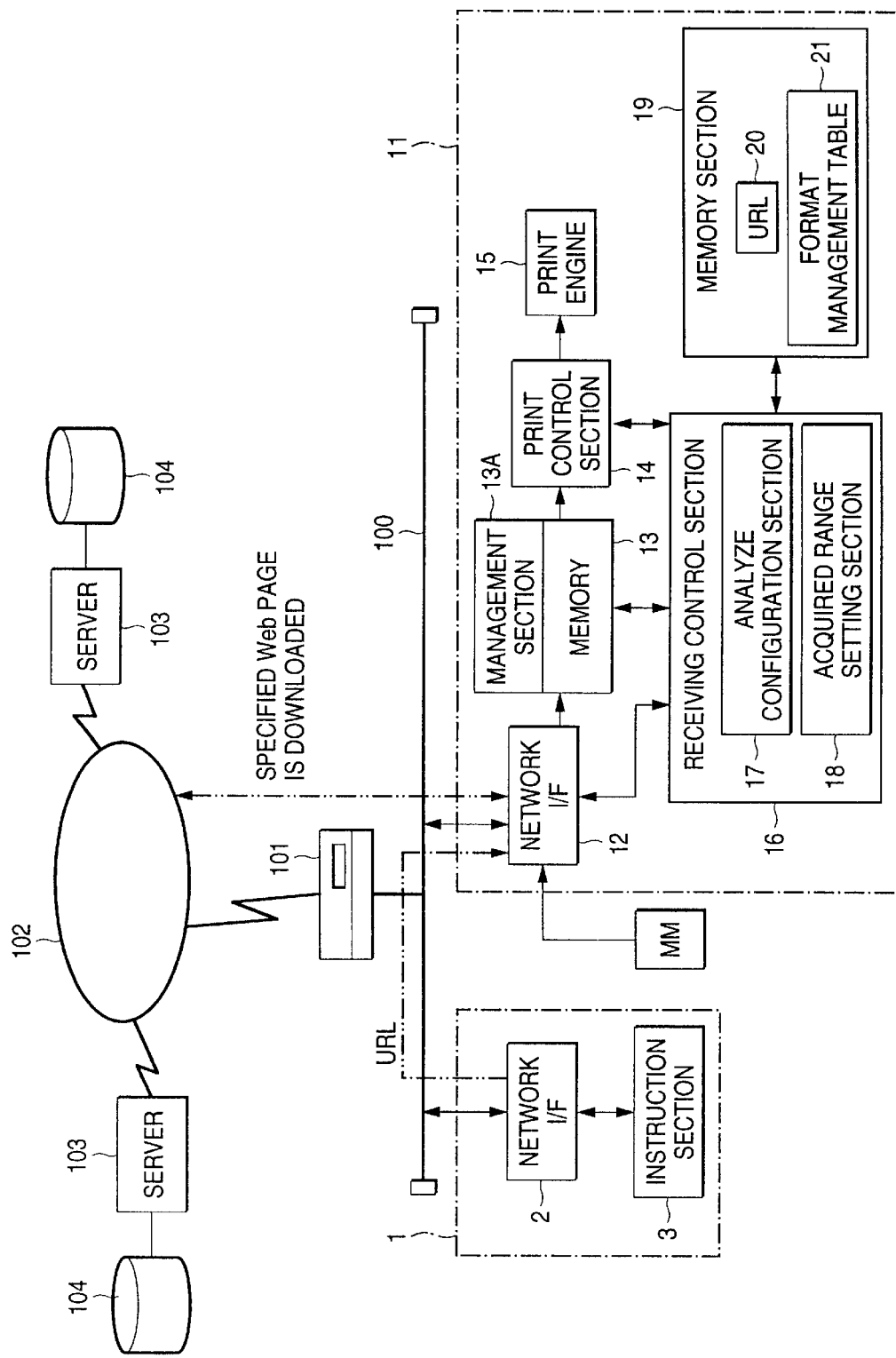
FIG. 1 is a block diagram showing the functional configuration of a network printing system and others equivalent to a first embodiment of the present invention.

Referring to the drawings, embodiments of the present invention will be described in detail below.

First Embodiment

First, referring to FIGS. 1 to 6, a first embodiment of the present invention will be described.

FIG. 1 is a functional block diagram showing the whole configuration of a network printing system using a network printer equivalent to this embodiment.

A router 101 is provided to a communication line 100 such as a LAN and the communication line 100 is connected to the Internet 102 via the router 101. Multiple servers 103 such as a WWW server are connected to the Internet 102 and each server 103 stores various information resources in its spool device 104. For information resources, a Web page provided by a WWW server, a file provided by a FTP server, Netnews provided by a news server and others are known, however, in this embodiment, a Web page is utilized as an example.

For example, a network interface 2 and a URL specifying section 3 are provided to a host computer 1 realized as a personal computer, a mobile information terminal and others. The network interface 2 is connected to a network printer 11 described later via the communication line 100 such as a LAN. The specifying section representable as access instruction means, access information input means or printing instruction means transmits URL for specifying a Web page to be printed to the network printer 11. URL can be also represented as specific information or access information for specifying information resources.

Needless to say, a printer driver may be also installed in the host computer 1 to issue a so-called local print job.

The network printer 11 is provided with a network interface 12, a memory 13, a printing control section 14, a printing engine 15, a receive control section 16, a storage section 19 and others as described later.

For example, the network interface 12 presentable as a network connecting means is provided with various hardware such as a LAN driver for connecting to LAN 100, various protocols such as Transmission control protocol/Internet protocol (TCP/IP) and HTTP and Ethernet as the network interface 2 on the side of the host computer.

The memory 13 is provided to temporarily store HTML data downloaded from each server 103 and others and is controlled by a memory control section 13A.

The printing control section 14 as printing control means prints the data downloaded from the server 103 by interpreting it, generating print image data and controlling the operation of the printing engine 15.

The printing engine 15 includes a paper feed mechanism, a print head and others to print on a record medium such as paper. For the printing engine 15, various engines used in a page printer for printing in units of page such as a laser printer, a serial printer for printing in units of character such as an ink-jet printer and a thermal transfer printer, a line printer for printing in units of line, and others can be used.

The receive control section 16 controls access to a Web page, downloading and others. The receive control section 16 accesses a Web page as information resources specified by the host computer 1 and downloads only predetermined information from the Web page. For the internal function of the receive control section 16, a configuration analyzing subsection 17 as configuration analyzing means and an acquired range setting subsection 18 as acquired range setting means are provided.

The configuration analyzing subsection 17 analyzes where and what type of information is embedded based upon HTML source data in a Web page. The acquired range setting subsection 18 specifies the range of information to be received according to a preset receiving allowance condition.

Figure 2:
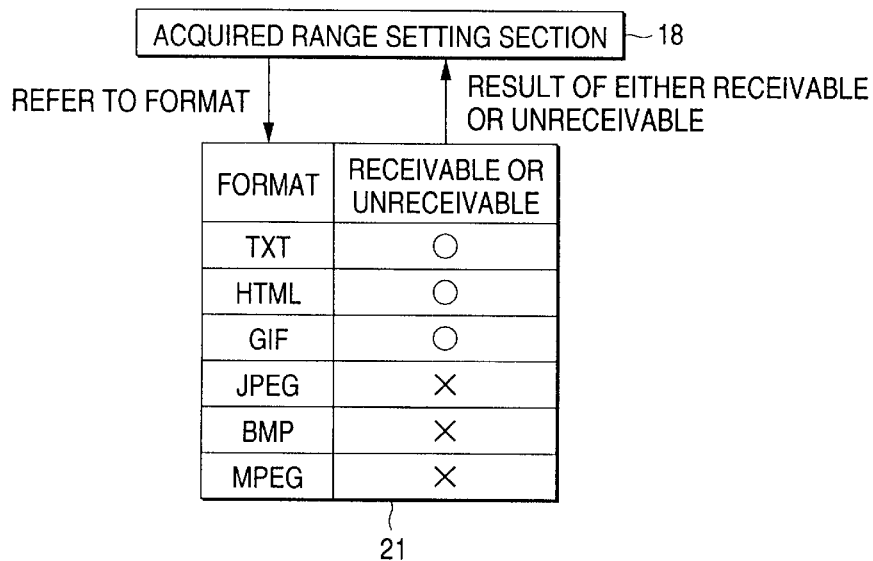
FIG. 2 is an explanatory drawing showing the configuration of a format management table.

A URL storage subsection 20 for storing URL specified by the host computer 1 and a format management table 21 as a receiving allowance condition are provided to a storage section 19 as storage means. In the format management table 21, which functions as a format management means, information which represents whether formats such as TXT, HTML and GIF are able to be received or not is stored, as shown in FIG. 2. In FIG. 2, a mark O shows that the format is receivable and a mark x shows the format is unreceivable. The acquired range setting subsection 18 receives only data in a format which can be received as shown in management table 21.

Figure 3:
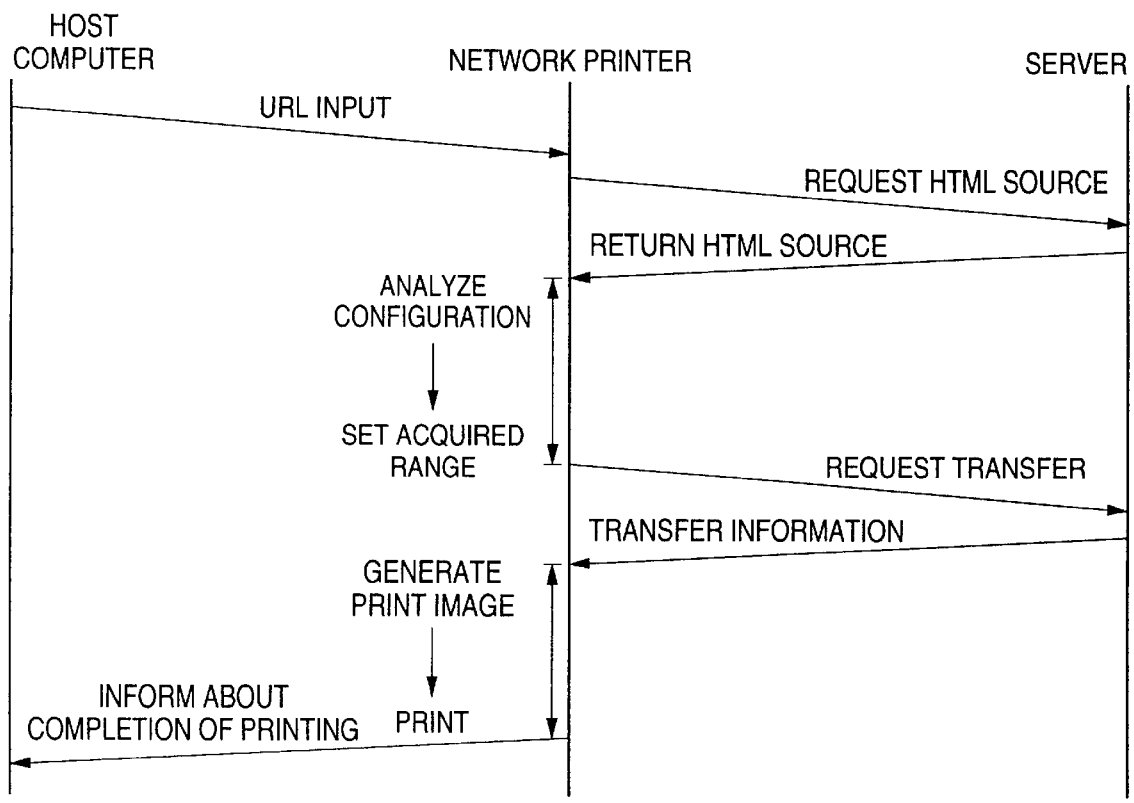
FIG. 3 is an explanatory drawing showing a communication state among a host computer, a network printer and a server.

Next, referring to FIGS. 3 to 6, action in this embodiment will be described. First, FIG. 3 is an explanatory drawing showing the operation of the whole system.

First, URL is input from the host computer 1 to the network printer 11. The network printer 11 accesses the specified URL and requests the transfer of an HTML source code as an example of configuration information. The network printer 11 which receives the HTML source code analyzes the source code and sets information to be received. For example, if it is determined to receive only a text and a small quantity of image data, the network printer requests a server 103 to transfer information according to the determined format. When required information is transferred, the network printer 11 generates print image data and prints. After printing is finished, a printing completion information may be issued to the host computer 1.

Figure 4:
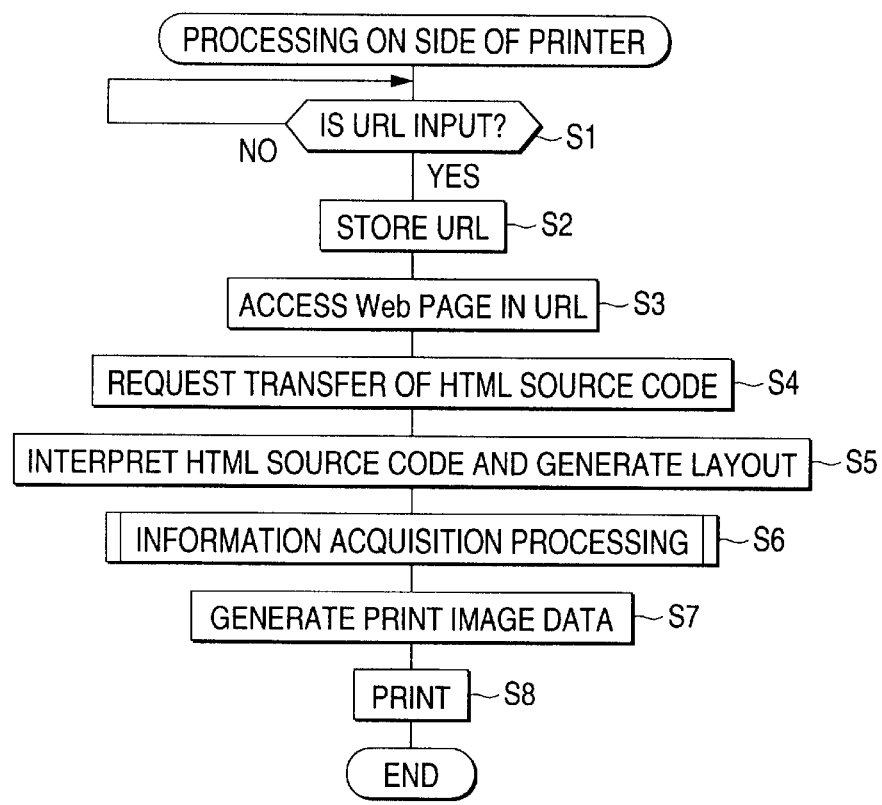
FIG. 4 is a flowchart showing processing executed by the network printer.

Next, FIG. 4 is a flowchart showing processing in the network printer 11.

First, in a step 1 (hereinafter abbreviated as S1), it is determined whether URL is input from the host computer 1 or not. When URL is input, the URL is stored in the URL storage subsection 20 in the storage section 19 in S2 and a Web page specified in the URL is accessed in S3.

When the transfer of an HTML source code is requested in S4 and the HTML source code is received, the HTML source code is interpreted and a layout is generated in S5. That is, the type of information such as a character and an image and size for the information to account in a print area are grasped and a layout in printing is generated.

As described later referring to FIG. 5, only predetermined information (data) is received from a server 103 in S6, print image data is generated in S7 and printing is executed in S8.

Figure 5:
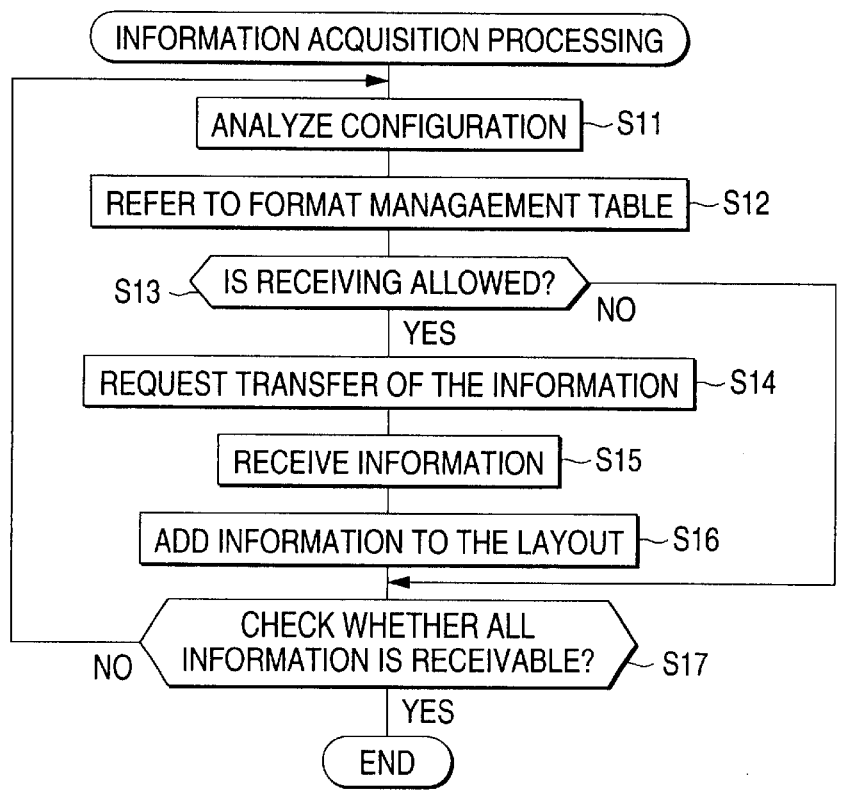
FIG. 5 is a flowchart showing the information acquisition processing shown in FIG. 4.

Next, FIG. 5 is a flowchart showing information acquisition processing shown as S6 in FIG. 4.

First, an HTML source code is analyzed and the formats of the information included therein are detected in S11. Next, the format management table 21 is referred to in S12 and it is judged in S13 whether receiving is allowed in the detected formats of the information or not.

If the format management table 21 shows that a certain format is a format in which receiving is allowed, the network printer requests a server 103 to transfer the information in S14. When the network printer receives the information requested to be transferred in S15, the network printer adds the information into the layout generated in S5 in FIG. 4 in S16. In the case of a format in which receiving is not allowed as shown in the format management table 21, the format is judged NO in S13 and the processing in S14 to S16 is skipped.

It is judged in S17 whether any information included in the HTML source code is checked in relation to whether receiving is allowed or not and the processing in S11 to S16 is repeated until the check of the information is finished.

Figure 6:
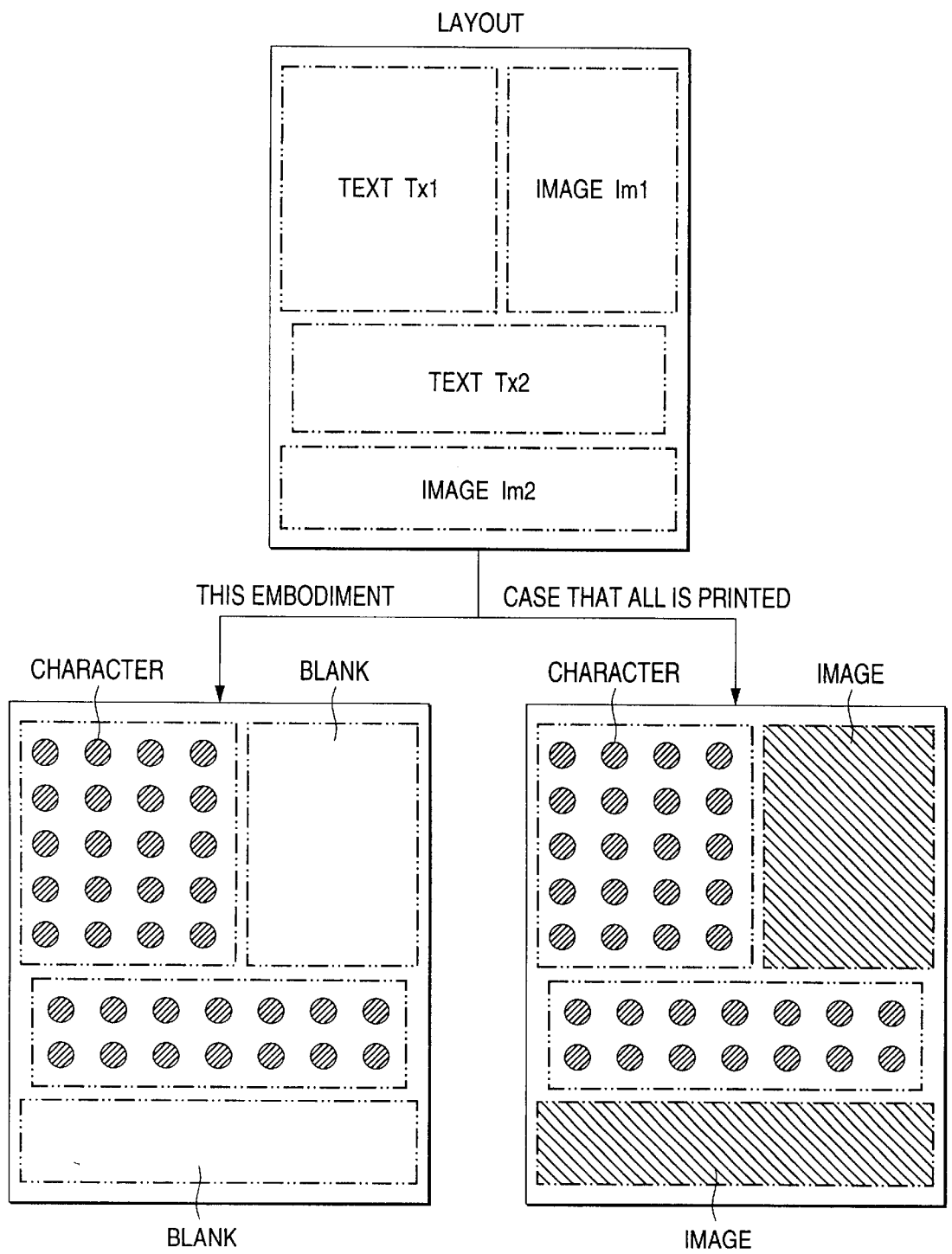
FIG. 6 is an explanatory drawing showing the relationship between layout data and the result of printing.

FIG. 6 is an explanatory drawing showing the result of printing in this embodiment.

In the upper part of FIG. 6, a layout generated based upon an HTML source code is shown. The layout is composed of two text data Tx1 and Tx2 and two image data Im1 and Im2.

As shown on the right side in the lower part of FIG. 6, if any information is received and printed, two text data and two image data are all printed. In the meantime, if the receiving of image data is refused, only text data is received and printed as shown on the left side in the lower part of FIG. 6.

According to this embodiment as described above, the following effect is produced:

First, the network printer 11 accesses specified information resources and receives it only by informing the network printer 11 of the URL of the desired information resources. Therefore, information resources on a network can be readily obtained as a printed matter without using the host computer 1. As the host computer 1 is relieved from the flow of processing for printing information resources after URL is specified via the host computer 1, the throughput of the host computer 1 can be allocated to another application program.

Second, as only preset information of specified information resources is received and printed, only required information can be promptly received and printed in high speed. In other words, transfer time can be reduced by preventing useless data transfer and the quantity of traffic in a network can be prevented from being increased. Further, the capacity of the memory 13 mounted in the network printer 11 can be reduced which enables low cost manufacture.

For example, this embodiment is constructed as follows.

A network printer for receiving and printing information resources on a network and characterized in that the network printer 11 actively accesses specified information resources via a network comprises configuration analyzing means 17 for analyzing the configuration of the information resources, format management means 21 which stores information which represents whether certain formats are able to be received or not, acquired range setting means 18 for setting the information acquired range of the above information resources by referring to the format management means 21 based upon the analyzed configuration, receive control means 16 for receiving predetermined information in the information resources based upon the above information acquired range and printing control means 14 for controlling the printing means 15 based upon information received from the information resources to print.

Second Embodiment

Figure 7:
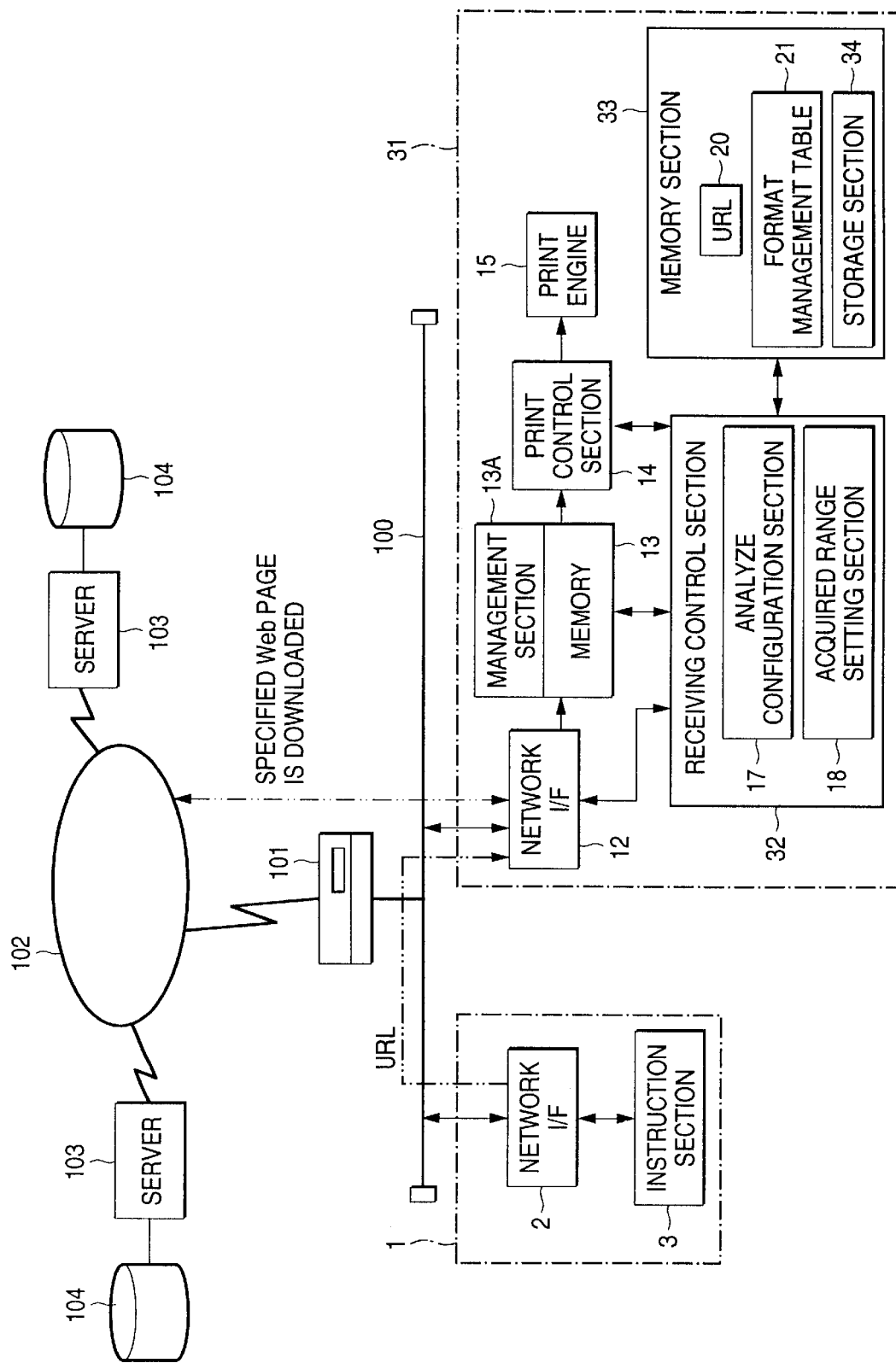
FIG. 7 is a block diagram showing the functional configuration of a network printing system equivalent to a second embodiment of the present invention.
Figure 8:
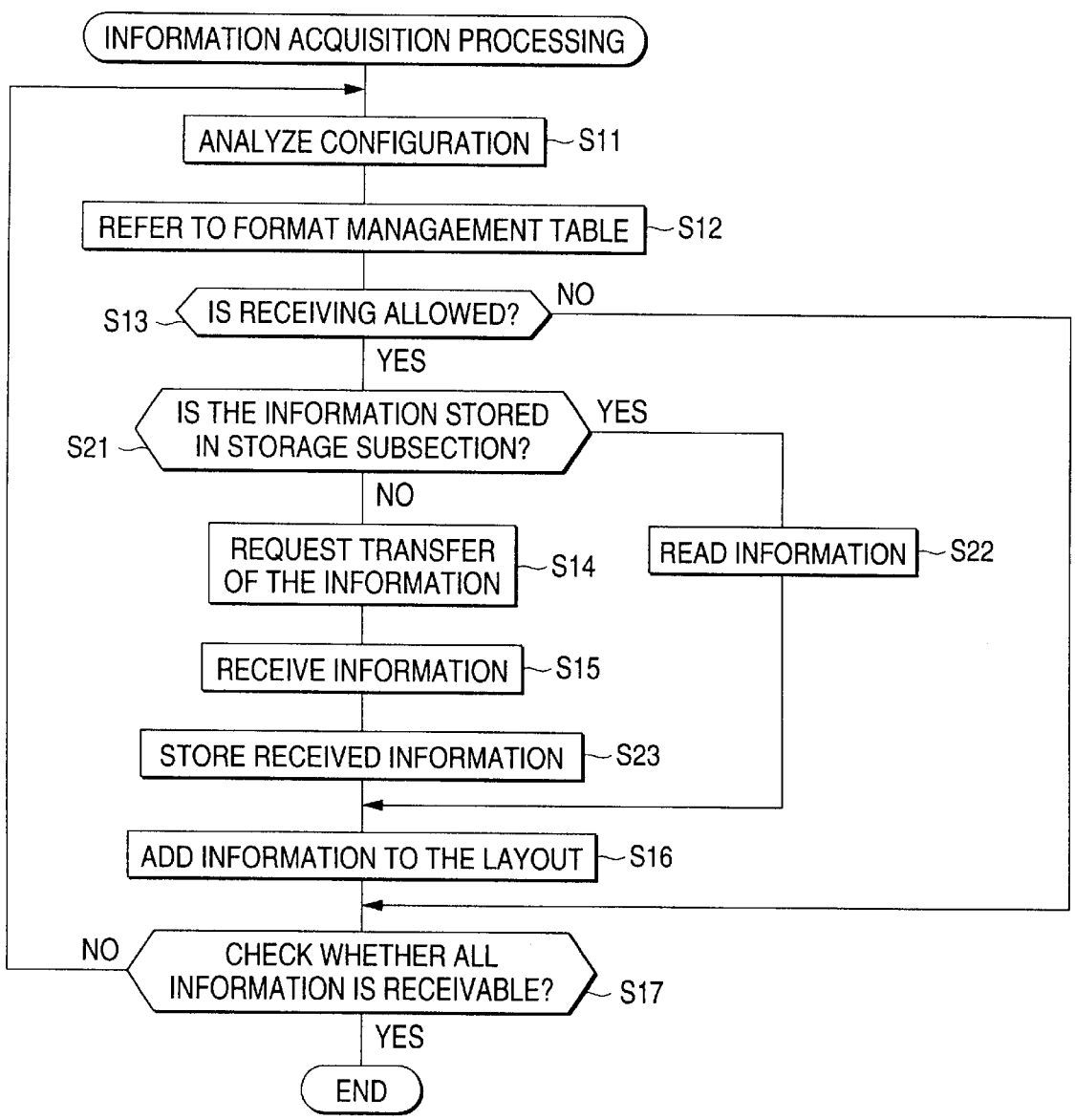
FIG. 8 is a flowchart showing information acquisition processing.

Next, referring to FIGS. 7 and 8, a second embodiment of the present invention will be described. In the following embodiment, the same reference numbers are allocated to the same components as in the above first embodiment and the description is omitted. This embodiment is characterized in that a large capacity storage section is provided to a network printer and if the information to be received is stored in the storage section, then the same information is not received.

A network printer 31 equivalent to this embodiment is provided with a printing control section 14, a receive control section 32, a storage section 33 and others as the network printer of the first embodiment. If certain information complies with a predetermined format in which receiving is allowed, the receive control section 32 judges whether the information is already stored or not. This embodiment is different from the above embodiment in that if the information is already stored, receiving is not executed.

The storage section 33 as storage means in this embodiment is composed of a relatively large capacity of storage such as a hard disk and a storage subsection 34 for storing information received in the past is provided in addition to a URL storage subsection 20 for storing URL and a format management table 21. The storage subsection 34 can be represented as information storage means. The whole storage section 33 is not required to be constituted by a large capacity of auxiliary storage. For example, the URL storage subsection 20 and the format management table 21 are stored in a nonvolatile memory and only the storage subsection 34 may be also composed of a hard disk and others.

Next, referring to a flowchart in FIG. 8, information acquisition processing in this embodiment will be described. This processing includes steps S11 to S17 of FIG. 5 and other steps.

That is, after it is judged in S13 referring to the format management table 21 in S12 that certain information is information in a format in which receiving is allowed, it is judged in S21 whether the information is stored in the storage subsection 34 or not. As the information is not required to be received again if it is already stored, the stored information is read from the storage subsection 34 in S22 and added into the layout of printing in S16. In the meantime, if the information is not stored, an information transfer request is issued in S14 and the information is received in S15. The received information is stored in the storage subsection 34 in S23.

In this embodiment constituted as described above, the similar effect to that in the above first embodiment can be also obtained. In addition, in this embodiment, as information received in the past is stored in the storage subsection 34 and the same information as the already stored information is not received, printing can be more promptly executed.

Third Embodiment

Figure 9:
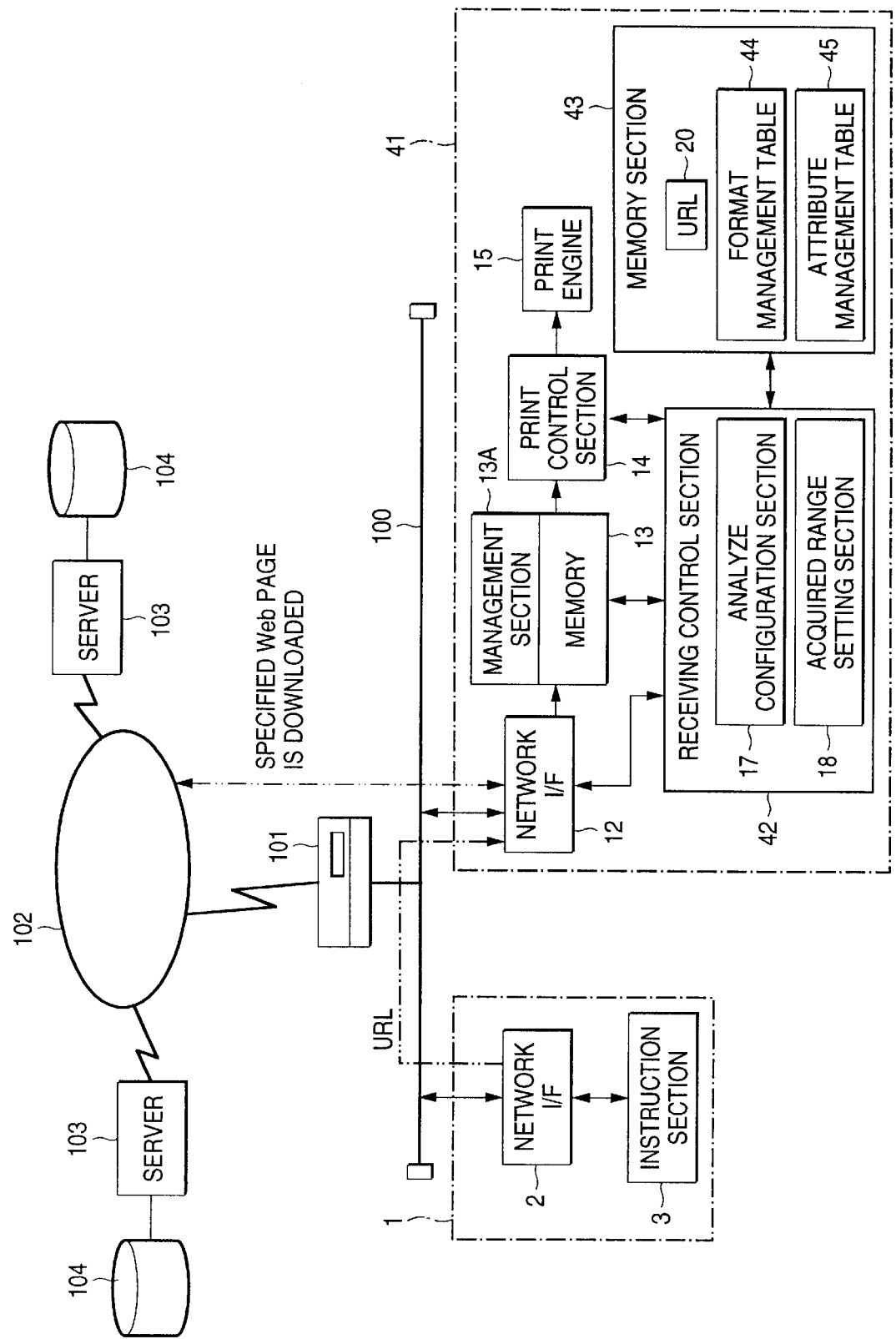
FIG. 9 is a block diagram showing the functional configuration of a network printing system equivalent to a third embodiment of the present invention.

Next, referring to FIGS. 9 to 11, a third embodiment of the present invention will be described. The third embodiment is characterized in that it is based upon the attribute of the information such as the quantity of data except a format whether receiving is allowed or not.

A network printer 41 in this embodiment is also provided with a printing control section 14, a printing engine 15, a receive control section 42, a storage section 43 and others are provided as the network printer 11 described in the first embodiment. The receive control section 42 in this embodiment is different from that in the above embodiments in that the receive control section judges whether information is received based upon not only the format of the information but the attribute or not. An attribute management table 45 in which the limitation of receiving based upon the attribute of information is stored and provided to the storage section 43 in addition to a URL storage subsection 20 and a format management table 44.

Figure 10:
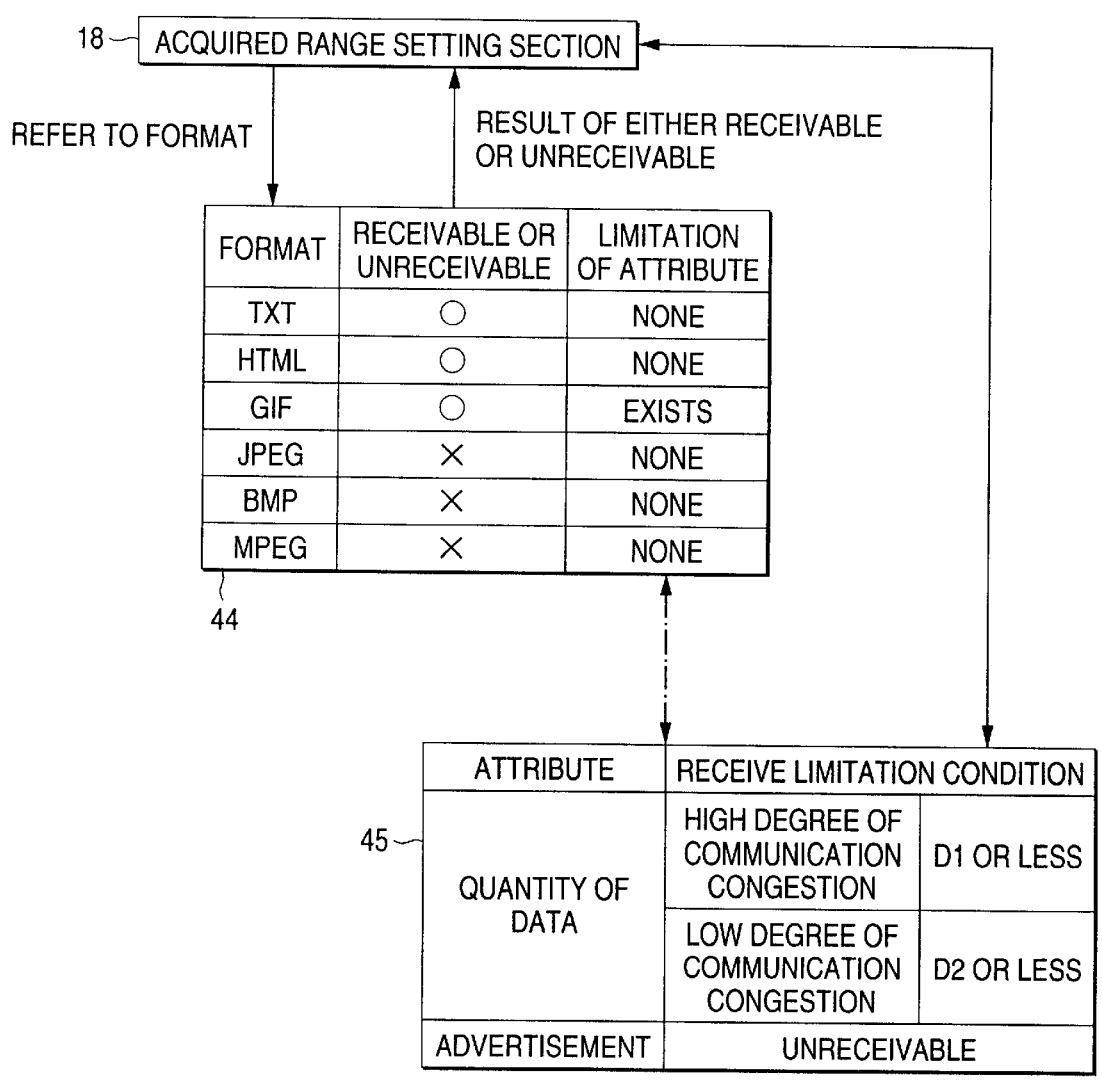
FIG. 10 is an explanatory drawing showing each configuration of a format management table and an attribute management table and relationship between them.

FIG. 10 is an explanatory drawing showing the configuration of the format management table 43, the attribute management table 45 and others.

In the format management table 43 in this embodiment, conditions indicating whether receiving is allowed or not for every format such as TXT and HTML are stored and predetermined information received from information resources is limited depending upon the attribute or not. For example, in FIG. 10, only in the case of GIF data, the predetermined information is limited based upon the attribute.

In the attribute management table 45 representable as attribute management means for example, a receive limitation condition is respectively stored for every attribute item extracted from the predetermined information. For example, in the case of the quantity of data as the attribute, the receivable maximum quantity of data is set depending upon whether the degree of the congestion of communication is large or not. If the degree of the congestion of communication is large, receiving is allowed only when the quantity of data is D1 bytes or less. In the meantime, if the degree of the congestion of communication is small, receiving of information up to D2 bytes (D2>D1) or less is allowed. The degree of the communication congestion can be observed based upon the quantity of transferred data per unit time, the response time of a server and others and the size of the degree of the congestion of communication can be judged by comparison with a preset reference value. The reference value is not required to be fixed and may be also dynamically adjusted depending upon another parameter such as a time zone of communication. If the degree of the communication congestion is small, the limitation of receiving based upon the quantity of data may be removed.

As another attribute of the attribute management table 45, advertisement may be also adopted. If advertisement information is embedded in a Web page, the receiving of the information is not allowed.

For a method of detecting advertisement information included in a Web page, the following two methods can be adopted: A first method is a method in which it is judged that certain information is advertisement information if information such as a phrase, a file name and URL which analogizes that the information is advertisement information is found in an HTML source code. Information related to an advertisement such as a phrase has only to be registered in a dictionary file beforehand. A second method is a method in which an image file is judged to be advertisement information if the image file is linked with a Web page of another server. That is, in the case when control is jumped to a Web page of another server when an image file on a Web page is clicked, it is judged that the image file is advertisement information.

For example, if there is description of <A HREF="http://www.xxx.co.jp/"><IMG SRC="xxx.gif"></A> in an HTML source code, the information can be judged to be advertisement information.

The format management table 44 and the attribute management table 45 may be also unified. Both management tables 44 and 45 may be also represented as receive condition management means.

Next, referring to FIG. 11, the action of this embodiment will be described. FIG. 11 is a flowchart showing information acquisition processing and provided with steps of S11, S13 to S17 shown in FIG. 5.

This embodiment is characterized in that if the format management table 44 and the attribute management table 45 are referred in S31 after configuration is analyzed in S11 and a certain format is judged a receivable format in S13, it is judged in S32 whether receiving is limited based upon the attribute or not.

In this embodiment constituted as described above, the similar effect to the effect in the above first embodiment can be also obtained. In addition, in this embodiment, as it is judged based upon not only the format but the attribute of information such as the quantity of data whether the information is to be received or not, required information can be more promptly received and high speed printing can be realized.

Figure 11:
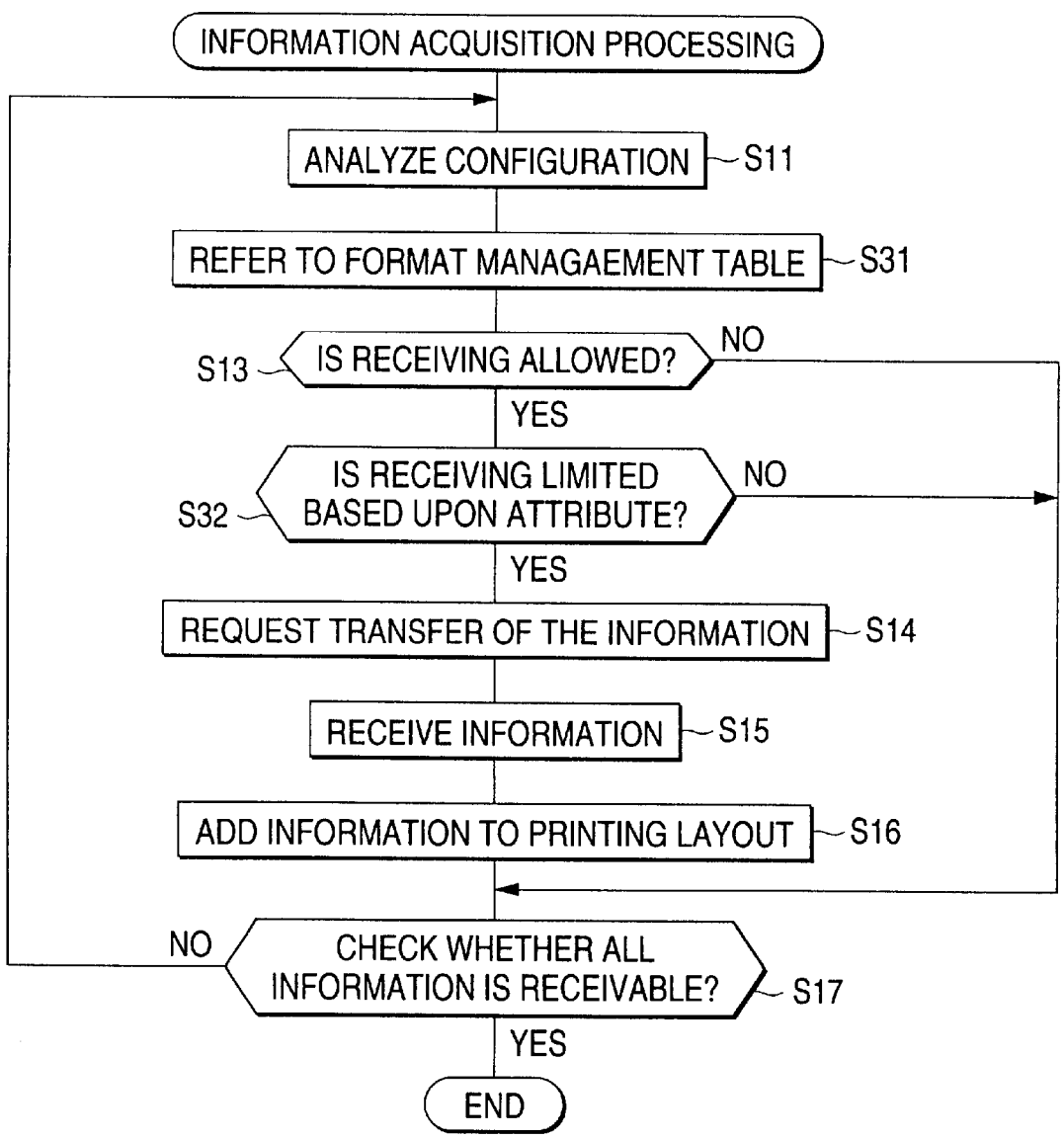
FIG. 11 is a flowchart showing information acquisition processing.
Figure 12:
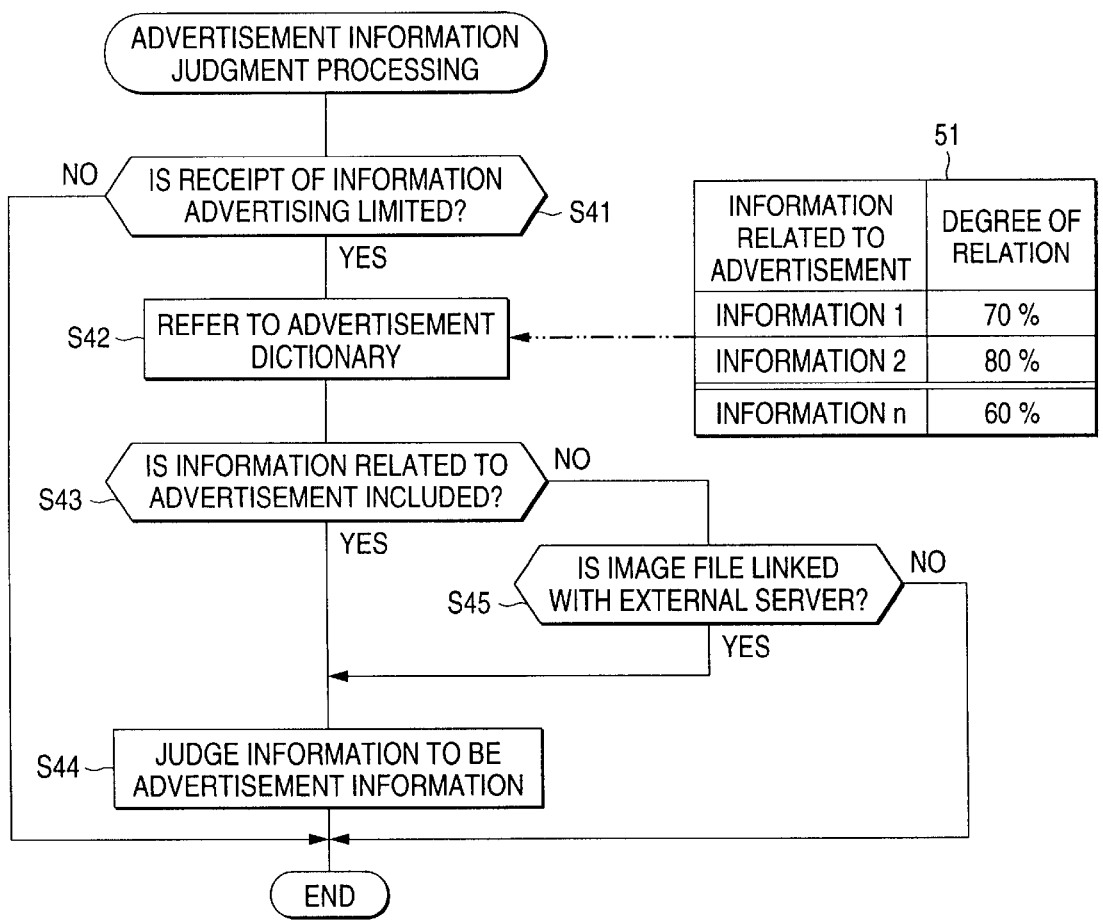
FIG. 12 is a flowchart showing advertisement information judgment processing.

A flowchart in FIG. 12 shows an example of advertisement information judgment processing which can be used in the judgment in S32 of limiting the attribute shown in FIG. 11.

First, it is judged in S41 whether a limitation on receiving advertisement information is set or not. If a limitation on advertisement information is set, a dictionary 51 of information related to advertisements in which a phrase, URL and others related to advertisement information are registered beforehand is referred in S42. Information related to advertisements such as a phrase related to advertisements can be stored together with the degree of the relation in the dictionary 51 of information related to advertisements.

It is judged in S43 whether information related to advertisements exists in an HTML source code or not, or whether information related to advertisements with a degree of relation higher than a predetermined degree of relation is included or not. If information related to advertisements is included, the information is judged to be advertisement information in S44.

In the meantime, if information related to advertisement is not included, it is judged in S45 whether an image file is linked with a Web page of another server or not and if the image file is linked with an external server, the image file is judged advertisement information in S44.

If the image file is judged to be advertisement information, not only is the advertisement information not received, but also the file name and others of the advertisement information, the receiving of which is refused, may be also displayed and printed. A user can readily know what advertisement is refused by partly printing limited information such as a file name.

This embodiment can be also represented as follows:

A network printer described as a representative 2 is based upon the network printer 11 for receiving and printing information resources on a network and characterized in that the network printer actively accesses to specified information resources via a network, and configuration analyzing means 17 for analyzing the configuration of the information resources, receive condition management means 44 and 45 in which it is set based upon the format and the attribute of information whether the receiving of information is allowed or not, acquired range setting means 18 for setting the information acquired range of the information resources by referring to the receive condition management means 44 and 45 based upon the analyzed configuration, receive control means 42 for receiving predetermined information from the information resources based upon the information acquired range and printing control means 14 for controlling printing means 15 based upon information received from the information resources to print are provided.

A network printer described as a representative 3 is the above network printer described as the representative 2 wherein at least one of the quantity and the display size of information, the degree of the congestion of communication in a network, either advertisement or not and either a color image or not is included in the attribute of the information.

A network printer described as a representative 4 is the network printer described as the representative 2 wherein at least the quantity of information and the degree of the congestion of communication are included in the attribute of the information, the receivable quantity of information of the receive condition management means 44 and 45 is set to a predetermined value D1 or less if the degree of the congestion of communication is larger than a reference value and is set to the predetermined value D1 or more if the degree of the congestion of communication is smaller than the reference value.

A network printer described as a representative 5 is the network printer described as the representative 3 wherein it is judged based upon whether information related to advertisement beforehand registered as resources related to advertisement is included or not whether certain information is advertisement or not.

A network printer described as a representative 6 is the network printer described as the representative 3 wherein it is judged based upon whether an image file linked with another information resources different from the accessed information resources exists or not whether certain information is advertisement or not.

Various addition and modification by the trader concerned are allowed within the range of the outline of the present invention described in each embodiment. For example, as shown in FIG. 1, a network printer according to the present invention can be realized by recording a predetermined program on a record medium MM and reading the program in the network printer. For the record medium, various record mediums such as a floppy disk, a flash memory and a hard disk can be adopted and in addition, the program can be also downloaded remotely via a communication line.

In the above embodiments, a Web page is given as an example of information resources, however, the present invention is not limited to a Web page and can be applied to various information resources such as a file provided by a FTP server.

Further, in the above embodiments, a case that information resources specified by the host computer 1 are received from a server on the Internet is shown as the example, however, the present invention is not limited to this case. Information resources may also exist in the host computer or peripheral equipment such as a digital camera not shown.

In the above third embodiment, for the attribute of information, the quantity of data, the degree of the congestion of communication and either advertisement or not are shown as the example, however, the present invention is not limited to them and whether receiving is allowed or not can be determined based upon various attributes such as either a color image or not, whether a display area is large or not and whether the number of scales is large or not.

Further, a network printer may be not only a printer dedicated to printing but a compound device provided with the functions of a copying machine, a facsimile and others.

As described above, according to the network printer and the network printing method respectively according to the present invention, the network printer can access to specified information resources without via the host computer, can individually and selectively receive and print only required information. Therefore, transfer time can be reduced by preventing useless data from being transferred and high speed printing can be realized.

What is claimed is:

1. A network printer for receiving and printing information resources on a network, comprising:

configuration analyzing means, disposed in said network printer, for actively accessing specified information resources via said network and analyzing the configuration of said information resources;

acquired range setting means, disposed in said network printer, for setting the information acquired range of said information resources based upon said configuration;

receive control means, disposed in said network printer, for receiving predetermined information from said information resources based upon said information acquired range; and printing control means, disposed in said network printer, for controlling printing means based upon said predetermined information received from said information resources and for instructing the printing means to print.

2. A network printer according to claim 1, wherein:

said acquired range setting means sets said information acquired range based upon the format of said information resources.

3. A network printer according to claim 1, wherein:

storage means for storing received information is further provided; and said acquired range setting means sets said information acquired range based upon the format of said information resources and the contents stored by said storage means.

4. A network printer according to claim 1, wherein:

said acquired range setting means sets said information acquired range based upon the format of said information resources and attribute information.

5. A network printer according to claim 1, wherein:

said acquired range setting means sets said information acquired range based upon the format of said information resources and the communication state of said network.

6. A network printer according to claim 3, wherein said storage means further includes a storage subsection.

7. A network printer according to claim 3, wherein said receive control means does not receive said predetermined information if said predetermined information is stored in said storage means.

8. A network printing method for receiving and printing information resources on a network, comprising:

a step for specifying an information resource;

a step for accessing said specified information resource via said network and acquiring the configuration information of said information resource, wherein said specified information resource is accessed via a network printer connected to said network and said configuration information of said information resource is determined by said network printer;

a step for analyzing the configuration of said information resource via said network printer based upon said configuration information;

a step for setting the information acquired range of said information resource via said network printer based upon said analyzed configuration;

a step for receiving information from said information resource via said network printer based upon said information acquired range; and a step for printing via said network printer based upon said information received from said information resource.

9. A network printing method according to claim 8, wherein:
said setting step sets said information acquired range based upon the format of said information resource.

10. A network printing method according to claim 8, wherein:
a step for storing said received information is further provided; and
in said setting step, said information acquired range is set based upon the format of said information resource and the contents of said received information that has been stored.

11. A network printing method according to claim 8, wherein:
in said setting step, said information acquired range is set based upon the format of said information resource and attribute information.

12. A network printing method according to claim 8, wherein:
in said setting step, said information acquired range is set based upon the format of said information resource and a communication state of said network.

13. A network printing method according to claim 8, wherein if said information is stored in a storage subsection, said receiving step is not performed and said information is read from said storage subsection.

14. A computer-readable medium on which a printing control program for receiving and printing information resources on a network is recorded, said program comprising;
configuration analyzing means for instructing a network printer to access specified information resources via said network and analyze the configuration of said information resources;
information acquisition managing means for instructing said network printer to decide whether information is to be acquired or not;
acquired range setting means for instructing said network printer to set the information acquired range of said information resources by referring to said information acquisition managing means and said configuration;
receive control means for instructing said network printer to receive predetermined information from said information resources based upon said information acquired range; and
printing control means for controlling printing means within said network printer based upon said predetermined information received from said information resources and for instructing the printing means to print.

15. A computer-readable medium as set forth in claim 14, wherein said information acquisition managing means decides whether information is to be acquired or not based on the degree of communication congestion.

16. A computer readable-medium as set forth in claim 14, wherein said information acquisition managing means decides whether information is to be acquired or not based upon the amount of advertising information contained in said information resources.

17. A computer-readable medium as set forth in claim 14, wherein said information acquisition managing means decides whether information is to be acquired or not based upon whether said information resources are linked to another information resource different than said specified information resource.

18. A network printer for receiving and printing information resources on a network, comprising:
configuration analyzing subsection, disposed in said network printer, for actively accessing specified information resources via said network and analyzing the configuration of said information resources;
acquired range setting subsections, disposed in said network printer, for setting the information acquired range of said information resources based upon said configuration;
receive control unit, disposed in said network printer, for receiving predetermined information from said information resources based upon said information acquired range; and
printing control section, disposed in said network printer, for controlling printing means based upon said predetermined information received from said information resources and for instructing the printing means to print.

19. The network printer as claimed in claim 1, further comprising:
an interface circuit that receives specifying information that identifies said information resources from an external source and supplies said specifying information to said configuration analyzing means.

20. The network printer as claimed in claim 19, wherein said external source is a host computer.

21. The network printer as claimed in claim 19, wherein said external source is an external memory.

22. The method as claimed in claim 8, wherein said specifying step comprises:
specifying identifying information that identifies said information resources via an external source that is external to said network printer; and
supplying said identifying information from said external source to said network printer.

23. The method as claimed in claim 22, wherein said external source is a host computer.

24. The method as claimed in claim 22, wherein said external source is an external memory.

25. The computer-readable medium as claimed in claim 14, further comprising software to instruct said network printer to receive identifying information from an external source, wherein said identifying information identifies said information resources.

26. The computer-readable medium as claimed in claim 25, wherein said external source is a host computer.

27. The computer readable medium as claimed in claim 25, wherein said external source is an external memory.

28. The network printer as claimed in claim 18, further comprising:
an interface circuit that receives specifying information that identifies said information resources from an external source and supplies said specifying information to said configuration analyzing subsection.

29. The network printer as claimed in claim 28, wherein said external source is a host computer.

30. The network printer as claimed in claim 28, wherein said external source is an external memory.

31. A network printer coupled to a network, comprising:
an interface circuit that is disposed in said network printer and receives identifying information identifying network information from an external electronic device;

a controller that is disposed in said network printer and that receives said identifying information from said interface circuit; and a memory that stores printable information data that identifies types of information to be printed by said network printer, wherein said controller determines types of information contained in said network information, wherein said controller determines requested portions of said network information to be printed by said network information based on said printable information data and said types of information contained in said network information, and wherein said controller generates a command requesting only said requested portions of said network information to be supplied to said network printer via said network.

32. The network printer as claimed in claim 31, wherein said printable information data identifies data formats to be printed by said network printer.

33. The network printer as claimed in claim 31, wherein said printable information data identifies whether or not graphics data and text data are to be printed by said network printer.

34. The network printer as claimed in claim 31, wherein said printable information data identifies whether or not advertisement data is to be printed by said network printer.

35. The network printer as claimed in claim 31, wherein said printable information data is stored in a management table in said memory and wherein said memory is disposed in said network printer.

36. The network printer as claimed 31, wherein said memory stores a downloaded portion of network information that has previously been supplied to said network printer via said network, and wherein said controller determines said requested portions of said network information to be printed based on said printable information data and said downloaded portion of network information stored in said memory.

37. The network printer as claimed in claim 36, wherein said controller determines that said requested portions exclude a portion of said network information that corresponds to said types of information identified by said printable information data but that corresponds to said downloaded portion stored in said memory.

38. The network printer as claimed in claim 31, wherein said controller determines said requested portions of said network information to be printed based on said printable information data and an attribute information of an evaluated portion of said network information.

39. The network printer as claimed in claim 38, wherein said attribute information comprises information regarding whether or not said evaluated portion of said network information corresponds to an advertisement.

40. The network printer as claimed in claim 38, wherein said attribute information comprises information regarding a data quantity of said evaluated portion.

41. The network printer as claimed in claim 40, wherein said controller determines that said evaluated portion is one of said requested portions when said data quantity is less than a predetermined quantity.

42. The network printer as claimed in claim 40, wherein said controller determines that said evaluated portion is not one of said requested portions when said data quantity is greater than a predetermined quantity.

43. The network printer as claimed in claim 40, wherein said controller determines that said evaluated portion is one of said requested portions when said data quantity is less than a first predetermined quantity and when a low amount of network congestion exists, wherein said controller determines that said evaluated portion is not one of said requested portions when said data quantity is greater than said first predetermined quantity and when said low amount of network congestion exists, wherein said controller determines that said evaluated portion is one of said requested portions when said data quantity is less than a second predetermined quantity and when a high amount of network congestion exists, wherein said second predetermined quantity is less than said first predetermined quantity, and wherein said controller determines that said evaluated portion is not one of said requested portions when said data quantity is greater than said second predetermined quantity and when said high amount of network congestion exists.

44. The network printer as claimed in claim 31, wherein said external electronic device is a host computer.

45. The network printer as claimed in claim 31, wherein said external electronic device is an external memory.

46. A computer-readable medium containing software instructions to instruct a controller of a network printer to perform the following operations:

receiving identifying information identifying network information, wherein said identifying information is supplied from an external electronic device to said network printer;

determining, via said controller in said network printer, types of information contained in said network information;

determining, via said controller in said network printer, requested portions of said network information to be printed by said network information based on printable information data that identifies types of information to be printed by said network printer and said types of information contained in said network information;

generating a command requesting only said requested portions of said network information to be supplied to said network printer via said network.

47. The computer-readable medium as claimed in claim 46, wherein said printable information data identifies data formats to be printed by said network printer.

48. The computer-readable medium as claimed in claim 46, wherein said printable information data identifies whether or not graphics data and text data are to be printed by said network printer.

49. The computer-readable medium as claimed in claim 46, wherein said printable information data identifies whether or not advertisement data is to be printed by said network printer.

50. The computer-readable medium as claimed in claim 46, wherein said printable information data is stored in a management table in a memory and wherein said memory is disposed in said network printer.

51. The computer-readable medium as claimed 46, wherein said memory stores a downloaded portion of network information that has previously been supplied to said network printer via said network, and wherein said software instructions instruct said controller to determine said requested portions of said network information to be printed based on said printable information data and said downloaded portion of network information stored in said memory.

52. The computer-readable medium as claimed in claim 51, wherein said software instructions instruct said controller to determine that said requested portions exclude a portion of said network information that corresponds to said types of information identified by said printable information data but that corresponds to said downloaded portion stored in said memory.

53. The computer-readable medium as claimed 46, wherein said software instructions instruct said controller to determine said requested portions of said network information to be printed based on said printable information data and an attribute information of an evaluated portion of said network information.

54. The computer-readable medium as claimed in claim 53, wherein said attribute information comprises information regarding whether or not said evaluated portion of said network information corresponds to an advertisement.

55. The computer-readable medium as claimed in claim 53, wherein said attribute information comprises information regarding a data quantity of said evaluated portion.

56. The computer-readable medium as claimed in claim 55, wherein said software instructions instruct said controller to determine that said evaluated portion is one of said requested portions when said data quantity is less than a predetermined quantity.

57. The computer-readable medium as claimed in claim 55, wherein said software instructions instruct said controller to determine that said evaluated portion is not one of said requested portions when said data quantity is greater than a predetermined quantity.

58. The computer-readable medium as claimed in claim 55, wherein software instruction instruct said controller to perform a routine of:

determining that said evaluated portion is one of said requested portions when said data quantity is less than a first predetermined quantity and when a low amount of network congestion exists, determining that said evaluated portion is not one of said requested portions when said data quantity is greater than said first predetermined quantity and when said low amount of network congestion exists, determining that said evaluated portion is one of said requested portions when said data quantity is less than a second predetermined quantity and when a high amount of network congestion exists,
      wherein said second predetermined quantity is less than said first predetermined quantity, and
      determining that said evaluated portion is not one of said requested portions when said data quantity is greater than said second predetermined quantity and when said high amount of network congestion exists.

59. The computer-readable medium as claimed in claim 46, wherein said external electronic device is a host computer.

60. The computer-readable medium as claimed in claim 46, wherein said external electronic device is an external memory.

* * * * *